(12) United States Patent
Ewerhart et al.

(10) Patent No.: US 8,086,406 B2
(45) Date of Patent: Dec. 27, 2011

(54) SAFETY SYSTEM FOR A MEANS OF TRANSPORTATION AND A METHOD RELATING TO THE SAME

(75) Inventors: Frank Ewerhart, Weinsberg (DE); Uwe Werner, Frankfurt (DE); Heiko Freienstein, Weil der Stadt (DE); Jan Tilp, Gröbenzell (DE); Joachim Selinger, Stuttgart (DE); Soenke Carstens-Behrens, Bonn (DE); Markus Hagemann, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1236 days.

(21) Appl. No.: 10/590,612

(22) PCT Filed: Jan. 5, 2005

(86) PCT No.: PCT/EP2005/050029
§ 371 (c)(1),
(2), (4) Date: Jun. 8, 2007

(87) PCT Pub. No.: WO2005/080133
PCT Pub. Date: Sep. 1, 2005

(65) Prior Publication Data
US 2007/0299610 A1     Dec. 27, 2007

(30) Foreign Application Priority Data
Feb. 24, 2004   (DE) .................. 10 2004 008 894

(51) Int. Cl.
*G08G 1/16* (2006.01)
(52) U.S. Cl. ............ 701/301; 701/41; 701/302; 342/147
(58) Field of Classification Search .................. 701/301, 701/41; 180/167, 169; 340/902, 436; 107/113; 133/139, 146
See application file for complete search history.

(56) References Cited

U.S. PATENT DOCUMENTS
5,699,040 A * 12/1997 Matsuda .................. 340/435
(Continued)

FOREIGN PATENT DOCUMENTS
DE         198 09 416          9/1999
(Continued)

OTHER PUBLICATIONS

A collision mitigation system using laser scanner and stereovision fusion and its assessment; Labayrade, R.; Royere, C.; Aubert, D.; Intelligent Vehicles Symposium, 2005. Proceedings. IEEE; Digital Object Identifier: 10.1109/IVS.2005.1505143 Publication Year: 2005 , pp. 441-446.*

(Continued)

*Primary Examiner* — Cuong H Nguyen
(74) *Attorney, Agent, or Firm* — Kenyon & Kenyon LLP

(57) ABSTRACT

In order to enhance a safety system, in particular an accident avoidance system for a means of transportation, in particular a motor vehicle, having at least one steering system and at least one brake system in such a way that an avoidance maneuver initiated by the operator of the means of transportation when approaching an obstacle is supported with respect to both the device and the method, thus preventing an accident through collision, the evaluation unit determines at least one driving variation, in particular at least one avoidance trajectory and/or at least one automatic emergency braking action from the data and information and when or after the operator of the means of transportation initiates a driving maneuver, in particular an avoidance maneuver or an emergency braking maneuver, the safety system, in particular the evaluation unit specifies, supports and/or suggests this driving maneuver in an optimized form, in particular in the form of an optimal avoidance trajectory or in the form of an automatic emergency braking.

11 Claims, 3 Drawing Sheets

U.S. PATENT DOCUMENTS

| | | | |
|---|---|---|---|
| 6,035,053 A * | 3/2000 | Yoshioka et al. | 382/104 |
| 6,084,508 A * | 7/2000 | Mai et al. | 340/463 |
| 6,275,773 B1 * | 8/2001 | Lemelson et al. | 701/301 |
| 6,338,022 B1 * | 1/2002 | Shinmura et al. | 701/301 |
| 6,353,788 B1 * | 3/2002 | Baker et al. | 701/96 |
| 6,359,553 B1 * | 3/2002 | Kopischke | 340/436 |
| 7,016,783 B2 * | 3/2006 | Hac et al. | 701/301 |
| 7,660,668 B2 * | 2/2010 | Lucas et al. | 701/301 |
| 2004/0030498 A1 * | 2/2004 | Knoop et al. | 701/301 |
| 2004/0193374 A1 * | 9/2004 | Hac et al. | 701/301 |
| 2006/0155455 A1 * | 7/2006 | Lucas et al. | 701/70 |
| 2006/0163943 A1 * | 7/2006 | Von Holt et al. | 303/177 |

FOREIGN PATENT DOCUMENTS

| | | |
|---|---|---|
| DE | 198 31 071 | 1/2000 |
| DE | 198 52 375 | 5/2000 |
| EP | 0 738 647 | 10/1996 |
| EP | 0 970 875 | 1/2000 |

OTHER PUBLICATIONS

Autonomous Pedestrian Collision Avoidance Using a Fuzzy Steering Controller; Fernández Llorca, D. et al.; Intelligent Transportation Systems, IEEE Transactions on; vol. PP , Issue: 99; Digital Object Identifier: 10.1109/TITS.2010.2091272; Publication Year: 2011 , pp. 1-12.*

Collision Warning with Full Auto Brake and Pedestrian Detection—a practical example of Automatic Emergency Braking Coelingh, E.; Eidehall, A.; Bengtsson, M.; Intelligent Transportation Systems (ITSC), 2010 13th International IEEE Conference on; Digital Object Identifier: 10.1109/ITSC.2010.5625077; Publication Year: 2010 , pp. 155-160.*

Automatic pre-crash collision avoidance in cars; Ferrara, A.; Intelligent Vehicles Symposium, 2004 IEEE; Digital Object Identifier: 10.1109/IVS.2004.1336369; Publication Year: 2004 , pp. 133-138.*

Weber, J. "New Results in Stereo-Based Automatic Vehicle Guidance". Proceedings of the Intelligent Vehicles '95 Symposium Sep. 25-Sep. 26, 1995, Detroit, USA Sponsored by IEEE Industrial Electronics Society. pp. 530-535, 1995.*

Hatipolgu, Cem. "On Optimal Design of a Lane Change Controller". Proceedings of the Intelligent Vehicles '95 Symposium Sep. 25-Sep. 26, 1995, Detroit, USA Sponsored by IEEE Industrial Electronics Society. pp. 436-441, 1995.*

Wasielewski, S. "Calibration of a Multi-Sensor System Laser Rangefinder/Camera". Proceedings of the Intelligent Vehicles '95 Symposium Sep. 25-Sep. 26, 1995, De/troit, USA Sponsored by IEEE Industrial Electronics Society. pp. 472-477, 1995.*

Guinand, Yves. "Low Cost Sensors for Collision Avoidance Applications". Proceedings of the Intelligent Vehicles '95 Symposium Sep. 25-Sep. 26, 1995, De/troit, USA Sponsored by IEEE Industrial Electronics Society. pp. 478-442, 1995.*

* cited by examiner

SAFETY SYSTEM FOR A MEANS OF TRANSPORTATION AND A METHOD RELATING TO THE SAME

FIELD OF THE INVENTION

The present invention relates to a safety system, in particular an accident avoidance system, and a method for operating such a safety system.

BACKGROUND INFORMATION

Active safety is one of the focuses in the development of present-day and also future vehicle systems. Known systems in the area of active safety, meaning accident avoidance, are, for example the electronic stability program (ESP) for stabilizing a vehicle by braking intervention in extreme driving situations as well as vehicle dynamics management (VDM) as an extension of ESP through additional steering interventions.

Besides vehicle stabilization systems, systems for triggering emergency braking are also known, which automatically intervene when a danger of a collision is detected, for example, based on environmental detection using radar and/or video sensors.

Furthermore, a large number of park assist devices are known which assist a driver when parking in a great variety of ways. Thus a park assist device is known from printed publication German Published Patent Application No. 198 09 416 which calculates a parking strategy as a function of the size of the potential parking space and informs the driver of the motor vehicle of this parking strategy; however, it leaves it up to the driver to decide whether to use the parking strategy.

Furthermore, in dangerous situations, average drivers often have problems with avoiding obstacles through a suitable steering maneuver. It is thus seen, for example, in driver safety training that steering is performed too late, too fast or too slowly, too much or too little or even not at all and in addition, that countersteering is performed incorrectly or not at all, for example, in a double lane change. This results either in a collision with an obstacle or an instability, for example, skidding of the vehicle.

Printed publication European Published Patent Application No. 0 970 875 describes a system intended to use steering actuators to prevent the driver from setting a steering angle leading to a collision or which automatically sets an avoidance course if necessary. In this system, the technical system decides if, when and in what direction an avoidance is made, thus relieving the driver of this. However, a technical implementation of this avoidance decision requires a high expense for sensors and brings up legal problems in terms of liability law, for example.

SUMMARY OF THE INVENTION

Proceeding from the disadvantages and inadequacies described above and with consideration of the outlined related art, the object of the present invention is to refine a safety system of the type referred to above as well as a method of the type referred to above in such a way that an avoidance maneuver initiated by the operator of the means of transportation when approaching an obstacle is supported with respect to both the device and the method, thus preventing an accident through collision or skidding.

In the safety system according to the present invention or in the method according to the present invention, the evaluation unit determines from the conditions detected by the detection unit in the form of data and information at least one driving variation, in particular at least one avoidance trajectory and/or at least one automatic emergency braking (AEB) action.

If the operator of the means of transportation initiates or has initiated a corresponding driving maneuver, in particular an avoidance maneuver or an emergency braking maneuver, the function of the safety system, in particular of the evaluation unit or of the method is then initiated to the effect that this driving maneuver is specified, supported and/or suggested in an optimized form, in particular in the form of an optimal avoidance trajectory or in the form of automatic emergency braking (AEB). In dangerous situations, this system significantly increases driving safety.

In an advantageous embodiment of the present invention, the steering system suggests to the operator of the means of transportation in an emergency avoidance situation the optimal avoidance trajectory, for example, in the form of an induced or applied steering torque and/or by a suitable haptic steering assist, thus also making safe avoidance possible even for inexperienced drivers.

The haptic steering assist may send a haptic signal, for example, in the form of at least one oscillation or at least one vibration and in this way inform the driver of a motor vehicle of the optimal avoidance trajectory, for example. The present invention thus includes a steering assist which is used, for example, for avoidance in emergencies.

Advantageously, the safety system or the method detects an approaching collision as well as the dimensions and distances to the obstacle using environmental detection sensors, for example, using radar and/or using video; these sensors may be attached at least to the front but also, if necessary, to the side and/or the rear of the vehicle.

Expediently, in the event at least the danger of a collision with an obstacle exists, the evaluation unit (=computer unit) calculates and/or suggests at least one optimal avoidance trajectory for the momentary situation both for a driving maneuver, for example, an avoidance to the left and for a driving maneuver, for example, an avoidance to the right which makes it possible to drive past the obstacle while maintaining driving stability.

In an embodiment essential to the present invention, the optimal avoidance trajectory in the corresponding direction is not specified until the driver initiates or has initiated an avoidance maneuver, either to the left or to the right, by turning the steering wheel. The specification may be haptic, for example, via an induced steering torque and/or the driver may override it at any time.

An advantage of this strategy is that the driver makes the extremely complex decision as to whether, when and in what direction the avoidance is made, thus reliably avoiding legal problems, in particular those relating to liability law.

In an advantageous embodiment of the present invention, in the event of danger, in particular a high risk of a collision, the evaluation unit sends at least one acoustic, haptic and/or optic warning and/or initiates automatic emergency braking (AEB) if no other driving variation, in particular no avoidance trajectory, is available.

The safety system according to the type explained above, in particular the evaluation unit according to the type explained above, and/or the method according to the type explained above, advantageously parameterizes, prepares and/or activates the steering system and/or the chassis of the means of transportation and/or the brake system in the event of danger, in particular in the event of a high risk of collision, so that the handling characteristics of the means of transportation are optimized for a driving maneuver to be performed by the operator of the means of transportation, in particular an avoidance maneuver or an emergency braking maneuver.

As an alternative to this, the present invention may relate to a safety system according to the type explained above, in particular an evaluation unit according to the type explained above as well as a method according to the type explained above, the steering system and/or the chassis of the means of transportation and/or the brake system being parameterized, prepared and/or activated in the event of danger, in particular in the event of a high risk of a collision, so that the handling characteristics of the means of transportation are optimized for a driving maneuver to be performed by the operator of the means of transportation, in particular an avoidance maneuver or an emergency braking maneuver.

The present invention finally relates to the use of at least one safety system according to the type described above and/or a method according to the type described above in at least one driver assist system for increasing the safety, in particular the avoidance of accidents in road traffic. Thus, for example, an emergency brake system (automatic emergency brake, AEB) may be extended by steering actuators within the context of the present invention.

DETAILED DESCRIPTION

Figure 1:
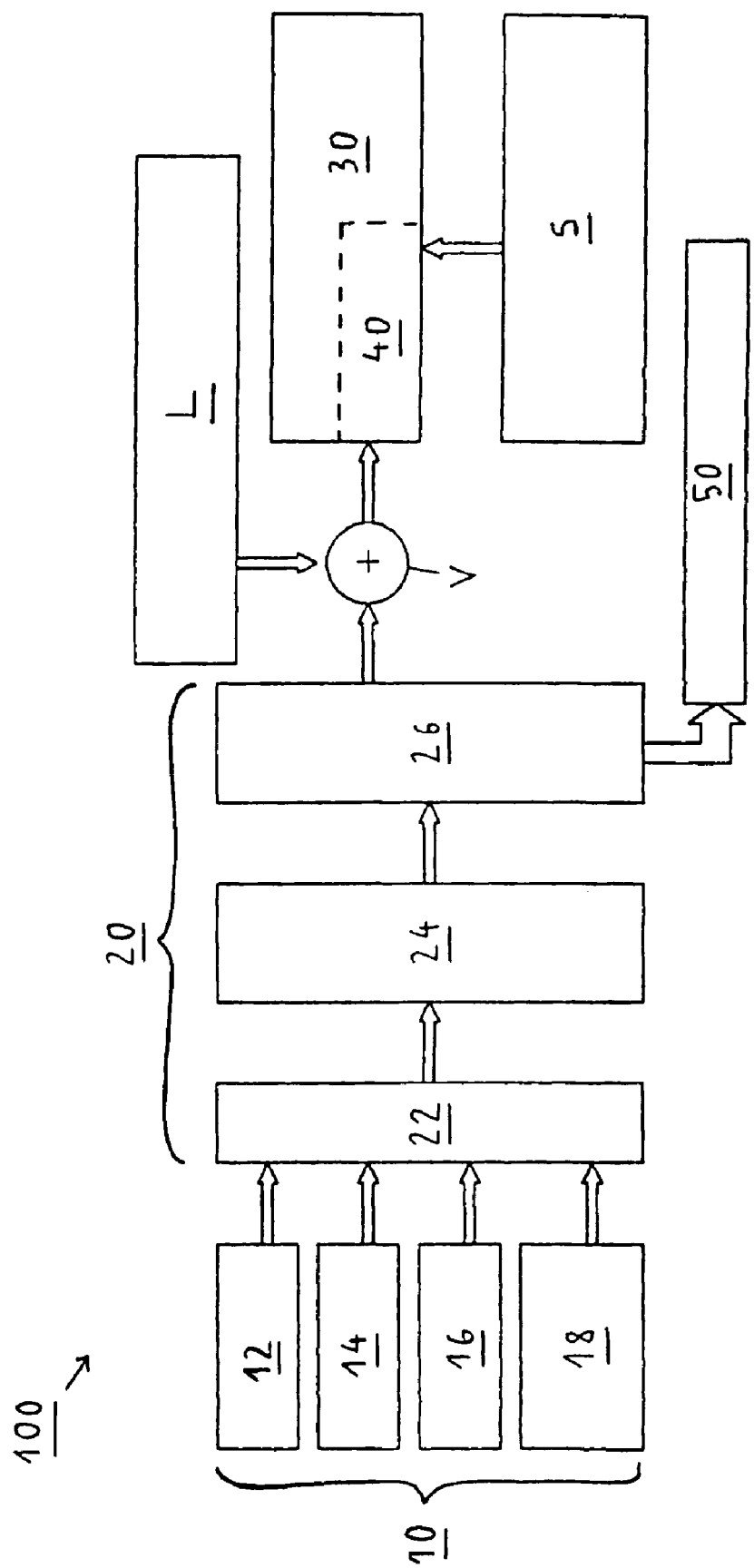
FIG. 1 shows a first exemplary embodiment of a safety system according to the present invention in schematic form, which functions according to the method of the present invention.
Figure 2:
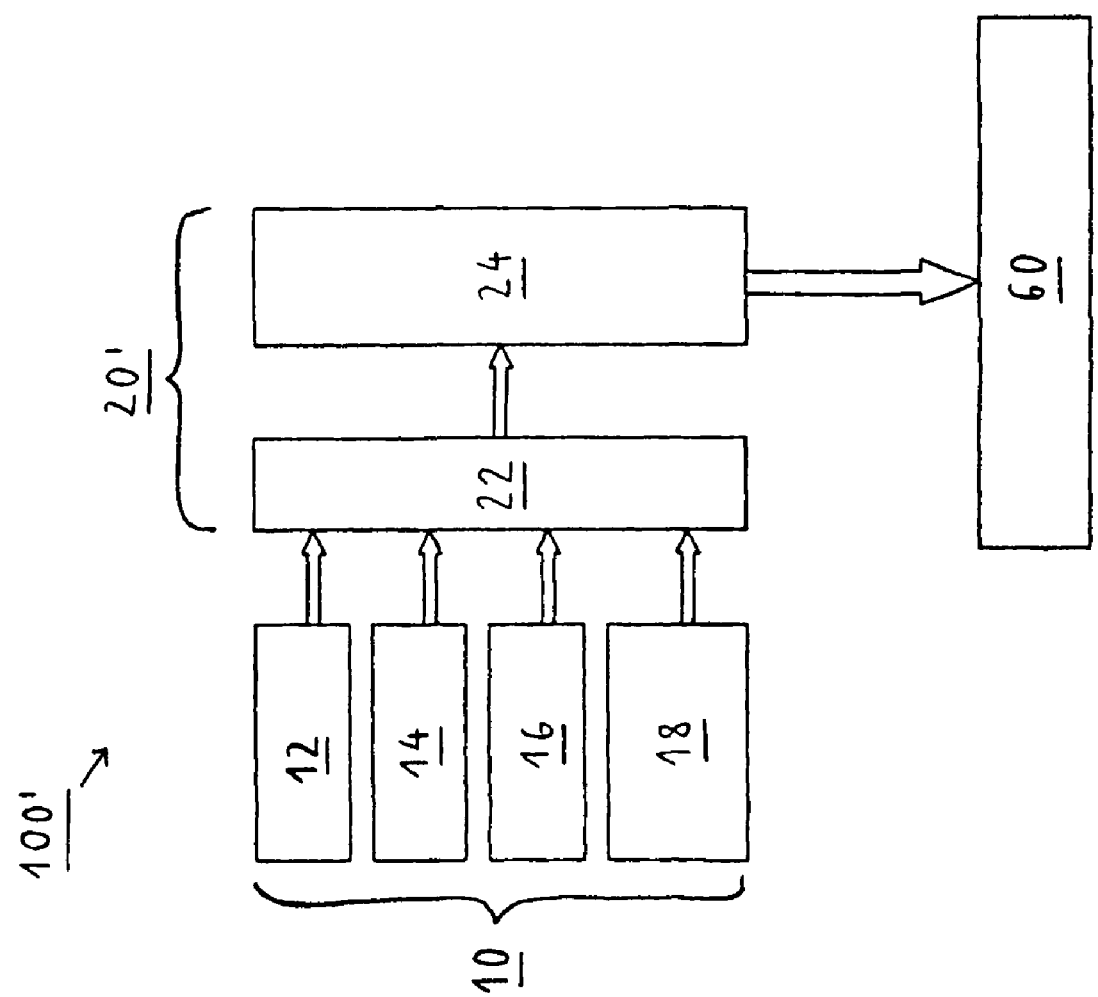
FIG. 2 shows a second exemplary embodiment of a safety system according to the present invention in schematic form, which functions according to the method of the present invention.
Figure 3:
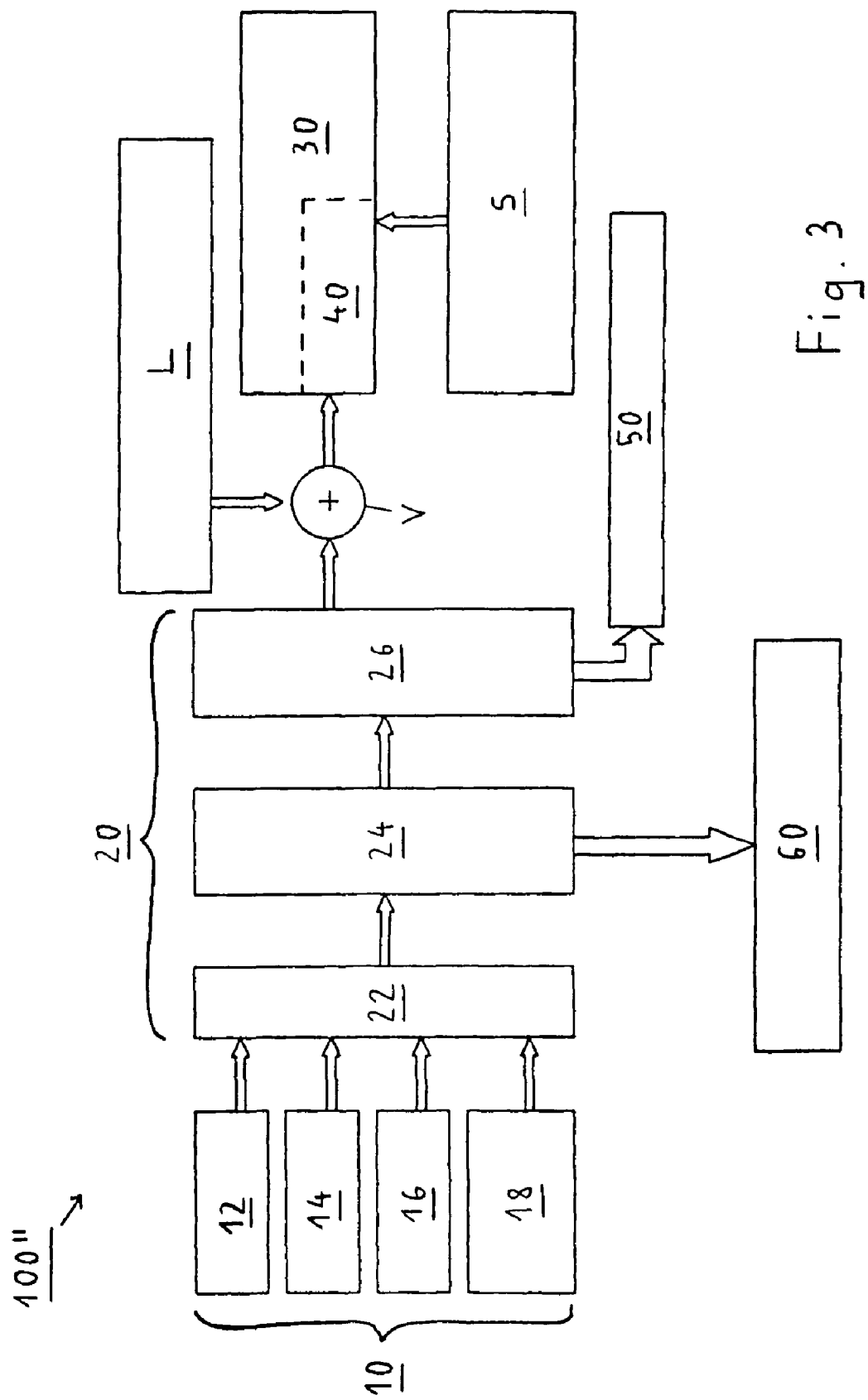
FIG. 3 shows a third exemplary embodiment of a safety system according to the present invention in schematic form, which functions according to the method of the present invention.

To avoid unnecessary repetitions, the following explanations with respect to the embodiments, features and advantages of the present invention (if not indicated elsewhere) refer both to the first exemplary embodiment of a safety system 100 shown in FIG. 1 as well as the second exemplary embodiment of a safety system 100' shown in FIG. 2 as well as the third exemplary embodiment of a safety system 100" shown in FIG. 3.

The particular schematic workflow of a safety system 100 or 100" for steering assist and for automatic emergency braking assist in an emergency, namely for an abrupt avoidance of an obstacle, is shown in FIGS. 1 and 3.

In a first step, internal and external conditions, specifically the parameters and the environment of a motor vehicle, are detected. To implement this function, safety system 100 has a detection unit 10 for environmental detection; the operation of this environmental detection unit 10 is based on, among other things, radar sensors 12 and video sensors 14.

Furthermore, using additional sensors 16, detection unit 10 is used additionally to detect data and information concerning the road traveled, for example, data and information concerning the number and width of lanes as well as the position of the host vehicle and of a potential colliding vehicle relative to the lanes. Data and information of a digital map 18 of a navigation system, for example, are also included in detection unit 10. Vehicle communications, vehicle-infrastructure communications and data of the host vehicle are also possible as additional information sources, the latter even being necessary.

The conditions detected are merged in the form of data and information by a sensor data merging module 22 and then evaluated by an evaluation module 24 with respect to the particular hazard potential; in particular the danger of a collision for the means of transportation is determined. Accordingly, detection unit 10 is used to detect objects in front of, to the side of and to the rear of the vehicle; they are compiled using sensor data merging module 22 and evaluated with respect to the danger of a collision for the vehicle using evaluation module 24.

After the danger of a collision is determined, an avoidance algorithm is prepared, i.e., a calculation module 26 calculates cyclically possible driving variations or avoidance trajectories which make safe and stable avoidance possible using the data and information concerning the obstacle and road, and data concerning the host vehicle. For example, if an obstruction occurs on the regular road surface, at least one optimal avoidance trajectory is calculated for the momentary situation for both an avoidance variation to the left as well as an avoidance variation to the right.

If an avoidance is no longer possible and it is thus not possible to determine avoidance trajectories or no avoidance trajectory exists, automatic emergency braking (AEB) (reference numeral 50) is triggered.

From the depiction of FIG. 1 as well as of FIG. 3, it is evident that sensor data merging module 22, evaluation module 24 and calculation module 26 are combined in an evaluation unit 20.

If in a situation of a high danger of collision, the operator of the means of transportation initiates (reference numeral L) a driving maneuver, i.e., the operator starts an (avoidance) steering maneuver by a corresponding steering motion, a suitable steering system, for example, a steer-by-wire system, suggests (reference numeral 30) an avoidance trajectory to the operator. Thus the optimal avoidance trajectory suggested to the driver at the time of or after determination 26 of the optimal avoidance trajectory is linked V with initiation L of the driving maneuver.

The driver is informed of this optimal avoidance trajectory in the form of an induced or applied steering torque 40, the driver being able to follow the suggested optimal avoidance trajectory or being able to override the suggested optimal avoidance trajectory (reference numeral S); overriding S of the optimal avoidance trajectory by the operator of the means of transportation is thus possible at any time.

It is conceivable to provide the driver with the optimal avoidance trajectory and/or the applied steering torque in the form of at least one haptic signal, for example, in the form of at least one oscillation or in the form of at least one vibration.

If the danger of collision is high, the driver may optionally be warned before the collision, for example, by an acoustic, haptic and/or optic warning.

To assist in avoidance in emergencies, safety system 100 or 100" (see FIG. 1 and FIG. 3, respectively) detects and evaluates the danger of collision with obstacles in front of the host vehicle and avoidance trajectories are calculated. If the driver initiates an avoidance maneuver, the driver may be given a haptic steering assist which suggests to him/her an optimal avoidance trajectory.

A safety system 100' for avoidance assistance in emergencies is shown in FIG. 2, the safety system having an evaluation unit 20' which is different from FIGS. 1 and 3. Evaluation unit 20' compiles data and information of detection unit 10 (reference numeral 22) and detects the danger of a collision with obstacles in front of the host vehicle (reference numeral 24).

When a danger of a collision is detected (and in view of an approaching avoidance maneuver by the driver), evaluation unit 20' parameterizes or prepares (reference numeral 60) the steering actuators and/or the brake system, in particular a brake assist and/or ESP, and/or an active chassis that may be present in such a way that the handling characteristics of the vehicle are optimized to an avoidance maneuver or emergency braking maneuver, for example, with respect to the position of the vehicle center of gravity, with respect to the steering characteristic, with respect to the damping or suspension and/or with respect to the roll stabilization.

In this safety system 100' according to FIG. 2, determination 24 of the danger of collision is thus followed by optimization 60 of the steering and of the chassis for the avoidance or the emergency braking maneuver.

This system provided for optimization 60 of the steering and the chassis may be, as shown in FIG. 2, configured as an independent version, i.e., without the suggestion of an avoidance trajectory or, as shown in FIG. 3, in combination with the haptic output of an avoidance trajectory explained with reference to FIG. 1.

What is claimed is:

1. A safety system corresponding to an accident avoidance system and for a motor vehicle that includes at least one steering system and at least one brake system, comprising:
   at least one detection unit for detecting internal and external conditions including vehicle parameters and a vehicle environment;
   at least one evaluation unit, wherein:
      the at least one evaluation unit compiles conditions detected by the at least one detection unit in the form of data and information,
      the at least one evaluation unit evaluates the detected conditions with respect to a hazard potential,
      the at least one evaluation unit determines from the data and information at least one driving variation, the determination including determining which of an optimal avoidance trajectory and at least one automatic emergency braking action is warranted, and
      when or after an operator of the motor vehicle initiates a driving maneuver corresponding to one of an avoidance maneuver and an emergency braking maneuver, the at least one evaluation unit:
         outputs to the operator an optimized form of the driving maneuver corresponding to the optimal avoidance trajectory, in an instance where the at least one evaluation unit determines that the optimal avoidance trajectory is warranted; and
         at least one of outputs to the operator a warning and initiates the at least one automatic emergency braking action, in an instance where the at least one evaluation unit determines that the at least one automatic emergency braking action is warranted.

2. The safety system as recited in claim 1, wherein:
   the steering system informs the operator of the optimal avoidance trajectory as at least one of:
      one of an induced steering torque and an applied steering torque,
      at least one haptic signal corresponding to one of at least one oscillation and at least one vibration, and
      an induced additional steering angle implemented by superimposed steering.

3. The safety system as recited in claim 1, wherein in the event of danger corresponding to a high risk of collision, the evaluation unit at least one of:
   sends at least one of an acoustic warning, a haptic warning, and a visual warning, and
   triggers the automatic emergency braking if no other driving variation corresponding to an avoidance trajectory is available.

4. The safety system as recited in claim 1, wherein the evaluation unit is configured to at least one of parameterize, prepare, and activate at least one of the steering system, the brake system, and a chassis of the motor vehicle in response to an evaluation that the hazard potential corresponds to a high risk of collision, so that the handling characteristics of the motor vehicle are optimized for a driving maneuver to be performed by the operator corresponding to one of an avoidance maneuver and an emergency braking maneuver.

5. The safety system as recited in claim 1, wherein the safety system is used in at least one driver assist system for increasing safety by avoiding accidents in traffic.

6. A computer-implemented method of a vehicle safety system comprising at least one computer processor, for increasing safety by avoiding accidents in road traffic, the method comprising:
   detecting, by the processor, internal and external conditions associated with parameters and an environment of a motor vehicle;
   compiling, by the processor, the detected conditions in the form of data and information;
   evaluating, by the processor, the detected conditions with respect to a hazard potential;
   determining, by the processor and from the data and information, at least one driving variation, the determination including determining which of an optimal avoidance trajectory and at least one automatic emergency braking is warranted; and
   one of during a driving maneuver and after the driving maneuver corresponding to one of an avoidance trajectory and an automatic emergency braking:
      outputting, by the processor and to the operator, an optimized form of the driving maneuver corresponding to the optimal avoidance trajectory, in an instance where the determination is that the optimal avoidance trajectory is warranted; and
      at least one of outputting to the operator a warning and initiating the at least one automatic emergency braking, by the processor, in an instance where the determination is that the at least one emergency braking is warranted.

7. The method as recited in claim 6, further comprising:
   in the event of danger corresponding to a high risk of collision, at least one of:
      emitting at least one of at least one acoustic signal, at least one haptic signal, and at least one visual warning signal, and
      triggering an automatic emergency braking if no other driving variation associated with an avoidance trajectory is available.

8. The method as recited in claim 6, wherein in the event of danger corresponding to an occurrence of an obstacle on a regular road surface, at least one avoidance trajectory is calculated both for a driving maneuver corresponding to an avoidance variation to the left as well as for a driving maneuver corresponding to an avoidance variation to the right that are optimal for the momentary situation.

9. The method as recited in claim 6, further comprising at least one of:

parameterizing, preparing, and activating at least one of the steering system, the brake system, and a chassis of the motor vehicle in response to an evaluation that the hazard potential corresponds to a high risk of collision, so that the handling characteristics of the motor vehicle are optimized for a driving maneuver to be performed by the operator corresponding to one of an avoidance maneuver and an emergency braking maneuver.

10. The method as recited in claim 6, wherein the method is used in at least one driver assist system for increasing safety by avoiding accidents in traffic.

11. The method as recited in claim 6, further comprising:
informing an operator of the motor vehicle of an optimal avoidance trajectory at least one of:
as one of an induced steering torque and an applied steering torque,
as at least one haptic signal corresponding to one of at least one oscillation and at least one vibration, and
as an induced additional steering angle implemented by superimposed steering.

* * * * *